United States Patent
Shen et al.

(10) Patent No.: US 11,748,969 B2
(45) Date of Patent: Sep. 5, 2023

(54) IMAGE PROCESSING METHOD AND APPARATUS

(71) Applicant: BEIJING BYTEDANCE NETWORK TECHNOLOGY CO., LTD., Beijing (CN)

(72) Inventors: Qichen Shen, Beijing (CN); Nan Hu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/882,496

(22) Filed: Aug. 5, 2022

(65) Prior Publication Data

US 2022/0375149 A1 Nov. 24, 2022

Related U.S. Application Data

(63) Continuation of application No. PCT/CN2021/075574, filed on Feb. 5, 2021.

(30) Foreign Application Priority Data

Feb. 6, 2020 (CN) .......................... 202010081376.5

(51) Int. Cl.
 G06V 10/25 (2022.01)
 G06T 7/62 (2017.01)
 (Continued)

(52) U.S. Cl.
 CPC ................ G06V 10/25 (2022.01); G06T 7/62 (2017.01); G06T 11/60 (2013.01); G06V 10/98 (2022.01)

(58) Field of Classification Search
 CPC ........... G06T 11/60; G06T 7/62; G06V 10/25; G06V 10/98
 See application file for complete search history.

(56) References Cited

U.S. PATENT DOCUMENTS

2007/0272753 A1* 11/2007 Scanlon ............. G06K 17/0032
 235/454
2013/0287265 A1* 10/2013 Nepomniachtchi .........................
 G06Q 20/3276
 382/115

FOREIGN PATENT DOCUMENTS

CN 101661609 A 3/2010
CN 108196742 A 6/2018
(Continued)

OTHER PUBLICATIONS

International Patent Application No. PCT/CN2021/075574; Int'l Written Opinion and Search Report; dated May 10, 2021; 7 pages.

*Primary Examiner* — Manuchehr Rahmjoo
(74) *Attorney, Agent, or Firm* — BakerHostetler (57) ABSTRACT

Disclosed in the embodiments of the present disclosure are an image processing method and apparatus. One specific embodiment of the method comprises: acquiring a target image, the target image being an image acquired by photographing content to be corrected; detecting the content to be corrected from the target image to acquire a polygonal frame surrounding the content to be corrected; acquiring a correction result of the content to be corrected, the correction result being used for representing whether the content to be corrected meets preset conditions; generating a correction mark corresponding to the correction result and matching the size of the polygonal frame; and outputting a target image comprising the generated correction mark in order to display the target image comprising the generated correction mark.

14 Claims, 5 Drawing Sheets

(51) Int. Cl.
*G06T 11/60* (2006.01)
*G06V 10/98* (2022.01)

(56) References Cited

FOREIGN PATENT DOCUMENTS

| | | |
|---|---|---|
| CN | 108205822 A | 6/2018 |
| CN | 108230283 A | 6/2018 |
| CN | 110321838 A | 10/2019 |
| JP | 2019-113611 A | 7/2019 |

* cited by examiner

IMAGE PROCESSING METHOD AND APPARATUS

CROSS REFERENCE OF RELATED APPLICATIONS

The present application is a continuation application of International Patent Application No. PCT/CN2021/075574, titled "IMAGE PROCESSING METHOD AND APPARATUS", filed on Feb. 5, 2021, which claims priority to Chinese Patent Application No. 202010081376.5, titled "IMAGE PROCESSING METHOD AND APPARATUS", filed on Feb. 6, 2020, with the China National Intellectual Property Administration, both of which are incorporated herein by reference in its entirety their entireties.

FIELD

Embodiments of the present disclosure relate to the technical field of computers, and in particular to a method for image processing and an apparatus for image processing.

BACKGROUND

With the development of science and technology, homework correction software is widely used by parents and teachers to correct answers given by students.

In the process of correcting homework with the homework correction software, a preset image corresponding to a correction result about an answer is presented around the answer after whether the answer is correct is determined. The preset image indicates a correct or incorrect answer. For example, an image including "√" and an image including "x" may be preset. The image including "√" may indicate that the answer is correct. The image including "x" may indicate that the answer is incorrect.

SUMMARY

A method for image processing and an apparatus for image processing are provided according to embodiments of the present disclosure.

In a first aspect, a method for image processing is provided according to an embodiment of the present disclosure. The method includes: acquiring a target image, where the target image is obtained by photographing to-be-corrected content; detecting the to-be-corrected content from the target image and acquiring a polygonal frame surrounding the to-be-corrected content; acquiring a correction result about the to-be-corrected content, where the correction result indicates whether the to-be-corrected content satisfies a preset condition; generating a correction identifier corresponding to the correction result and matching a size of the polygonal frame; and outputting the target image including the generated correction identifier, to display the target image including the generated correction identifier.

In some embodiments, the correction result corresponds to a predetermined point selection manner. The generating a correction identifier corresponding to the correction result and matching a size of the polygonal frame includes: selecting target points from the polygonal frame in the point selection manner corresponding to the correction result; and connecting the selected target points to generate the correction identifier.

In some embodiments, the selecting target points from the polygonal frame in the point selection manner corresponding to the correction result includes: selecting a target point on a side of the polygonal frame and selecting a target point inside the polygonal frame in the point selection manner corresponding to the correction result.

In some embodiments, the generating a correction identifier corresponding to the correction result and matching a size of the polygonal frame includes: acquiring a preset correction identifier sequence corresponding to the correction result, where preset correction identifiers in the preset correction identifier sequence are arranged in order of size, and respectively correspond to preset size ranges in a preset size range set; determining a size of the polygonal frame; determining, from the preset size range set, a preset size range matching the size of the polygonal frame, as a target size range; and determining a preset correction identifier corresponding to the target size range as the correction identifier corresponding to the correction result and matching the size of the polygonal frame.

In some embodiments, the detecting the to-be-corrected content from the target image and acquiring a polygonal frame surrounding the to-be-corrected content includes: detecting the to-be-corrected content from the target image, and acquiring a minimum quadrilateral frame surrounding the to-be-corrected content.

In some embodiments, the generating a correction identifier corresponding to the correction result and matching a size of the polygonal frame includes: determining a correction identifier corresponding to a type of the correction result as an initial correction identifier; adding the initial correction identifier to the polygonal frame with a center of the polygonal frame coincides with a center of the initial correction identifier; determining whether the initial correction identifier is fully enclosed in the polygonal frame; and scaling the initial correction identifier in response to the initial correction identifier failing to be enclosed in the polygonal frame, so that the initial correction identifier is fully enclosed in the polygonal frame; and acquiring the scaled initial correction identifier as the correction identifier matching the size of the polygonal frame.

In some embodiments, the method further includes: before the outputting the target image including the generated correction identifier, removing the polygonal frame from the target image.

In a second aspect, an apparatus for image processing is provided according to an embodiment of the present disclosure. The apparatus includes: a first acquisition unit, a detection unit, a second acquisition unit, a generation unit and an output unit. The first acquisition unit is configured to acquire a target image. The target image is obtained by photographing to-be-corrected content. The detection unit is configured to detect the to-be-corrected content from the target image and acquire a polygonal frame surrounding the to-be-corrected content. The second acquisition unit is configured to acquire a correction result about the to-be-corrected content. The correction result indicates whether the to-be-corrected content satisfies a preset condition. The generation unit is configured to generate a correction identifier corresponding to the correction result and matching a size of the polygonal frame. The output unit is configured to output the target image including the generated correction identifier, to display the target image including the generated correction identifier.

In some embodiments, the correction result corresponds to a predetermined point selection manner. The generation unit includes a selection module and a generation module. The selection module is configured to select target points from the polygonal frame in the point selection manner corresponding to the correction result. The generation module is configured to connect the selected target points to generate the correction identifier.

In a third aspect, an electronic device is provided according to an embodiment of the present disclosure. The electronic device includes: one processor or more processors, and a storage means on which one or more programs are stored. When the one or more programs are executed by one or more processors, the one or more processors implement the method for image processing according to any one of the above embodiments.

In a fourth aspect, a computer-readable medium having a computer program stored thereon is provided according to an embodiment of the present disclosure. When the program is executed by the processor, the method for image processing according to any one of the above embodiments is implemented.

BRIEF DESCRIPTION OF THE DRAWINGS

Other features, objects and advantages of the present disclosure will become more apparent after reading detailed description of non-limiting embodiments given with reference to the drawings.

DETAILED DESCRIPTION

The present disclosure will be further described in detail below with reference to the drawings and in conjunction with embodiments. It should be understood that the specific embodiments described herein are only for explaining the related invention rather than limiting the invention. In addition, it should be noted that only parts related to the invention are shown in the drawings for the convenience of description.

It should be noted that the embodiments of the present disclosure and features in the embodiments may be combined with each other under the condition of no conflict. The present disclosure will be described in detail below with reference to the drawings and in conjunction with the embodiments.

Figure 1:
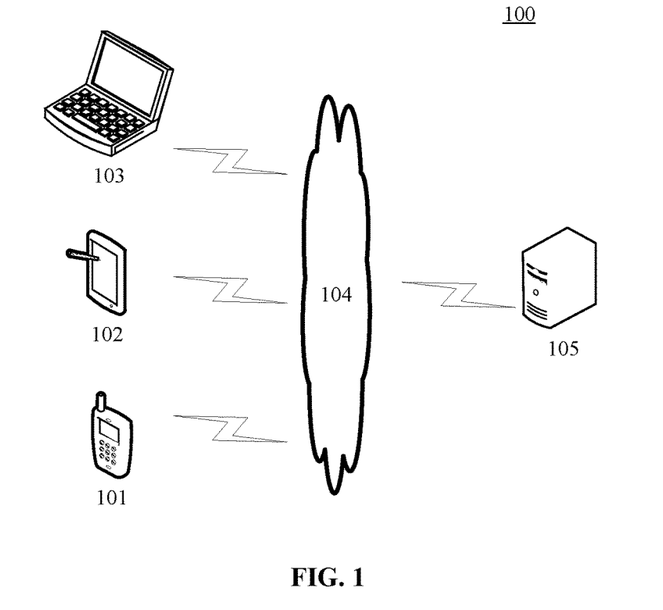
FIG. 1 is a diagram illustrating a system architecture to which an embodiment of the present disclosure may be applied.

FIG. 1 illustrates a system architecture 100 to which embodiments of a method for image processing or an apparatus for image processing according to the present disclosure may be applied.

As shown in FIG. 1, the system architecture 100 may include terminal devices 101, 102, and 103, a network 104 and a server 105. The network 104 is a medium for providing a communication link between the terminal devices 101, 102, as well as 103 and the server 105. The network 104 may include various connection types, such as wired communication links, wireless communication links, or fiber optic cables.

A user may use the terminal devices 101, 102, 103 to interact with the server 105 through the network 104, so as to receive or send messages and the like. The terminal devices 101, 102 and 103 each may be installed with various client applications such as education and learning software, homework correction software, a web browser application, a search application, an instant messaging tool, an email client, and social platform software.

The terminal devices 101, 102, and 103 each may be hardware or software. In the case of hardware, the terminal devices 101, 102, and 103 may be various electronic devices, including but not limited to a smart phone, a tablet computer, an e-book reader, and an MP3 (moving picture experts group audio layer III) player, an MP4 (moving picture experts group audio layer IV) player, a laptop, a desktop computer, and the like. In the case of software, the terminal devices 101, 102, and 103 may be installed in the electronic devices listed above, and may be implemented as multiple software or software modules (for example, multiple software or software modules for providing distributed services), or may be implemented as a single software or software module, which is not specifically limited herein.

The server 105 may be a server providing various services, for example, an image processing server that processes a target image sent by the terminal devices 101, 102, and 103. The image processing server may process received data such as analyzing a received target image and feed a processing result (for example, a target image including a generated correction identifier) back to the terminal devices.

It should be noted that, the method for image processing according to the embodiments of the present disclosure may be performed by the terminal devices 101, 102, and 103, or the server 105. Correspondingly, the apparatus for image processing may be arranged in the terminal devices 101, 102, and 103, or the server 105.

It should be noted that the server may be hardware or software. In a case of hardware, the server may be implemented as a distributed server cluster composed of multiple servers, or a single server. In a case of software, the server may be implemented as multiple software or software modules (for example, multiple software or software modules for providing distributed services), or a single software or software module, which is not specifically limited herein.

It should be understood that the number of the terminal devices, the number of the network and the number of the server in FIG. 1 are only illustrative. The terminal device, the network, and the server may vary in number if necessary.

Figure 2:
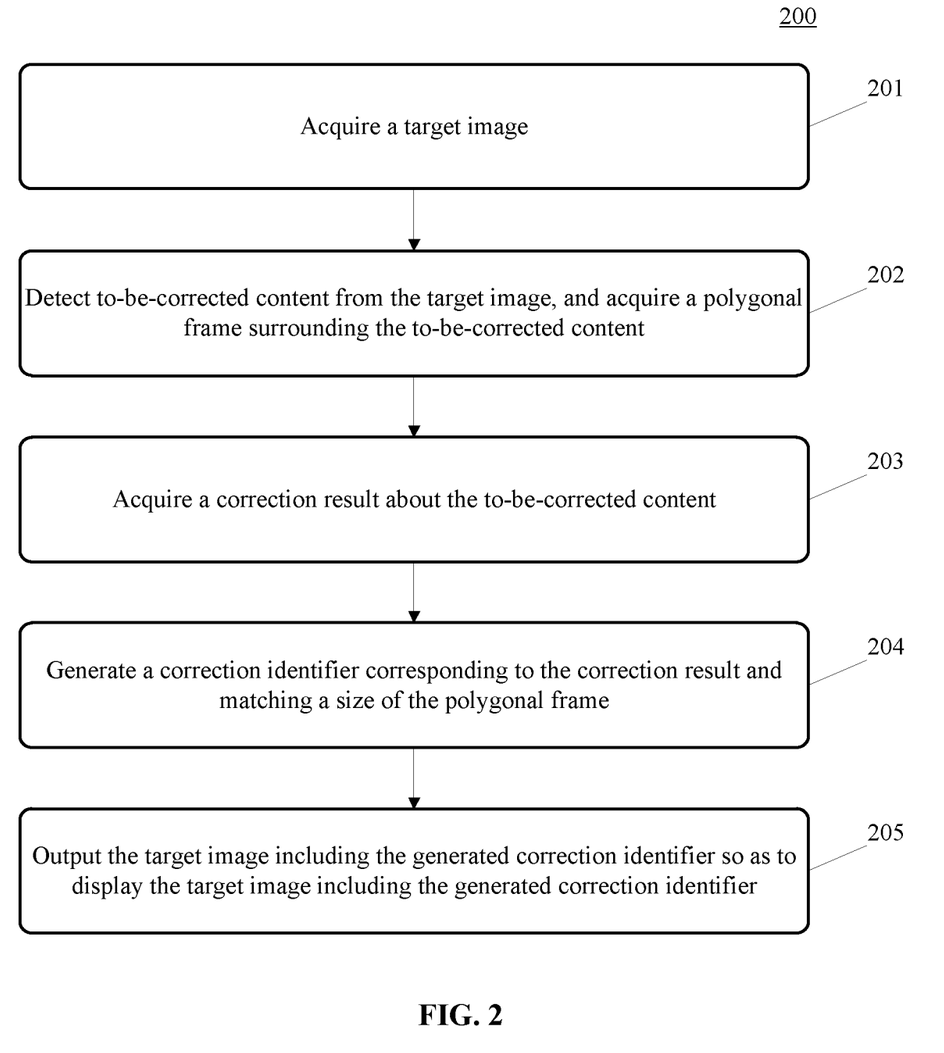
FIG. 2 is a flowchart illustrating a method for image processing according to an embodiment of the present disclosure.

Reference is made to FIG. 2, which illustrates a flow 200 of a method for image processing according to an embodiment of the present disclosure is shown. The method for image processing includes the following steps 201 to 205.

In step 201, a target image is acquired.

In this embodiment, a subject for performing the method for image processing (for example, the terminal device shown in FIG. 1) may acquire the target image remotely or locally through wired connection or wireless connection. The target image is obtained by photographing to-be-corrected content. The to-be-corrected content may be content to be determined whether it satisfies a preset condition. In case that the to-be-corrected content satisfies the preset condition, the to-be-corrected content is marked with a preset first-type correction identifier. In case that the to-be-corrected content does not satisfy the preset condition, the to-be-corrected content may be marked with a preset second-type correction identifier. For example, the first-type correction identifier may be "√", and the second-type correction identifier may be "x".

Here, the preset condition depends on the to-be-corrected content. In an example, the to-be-corrected content includes an answer to exercise, and the preset condition may be that the answer in the to-be-corrected content is the same as a preset answer. In another example, the to-be-corrected content includes vocabulary written by a student through dictation, and the preset condition may be that the vocabulary in the to-be-corrected content includes no typo.

In step 202, the to-be-corrected content is detected from the target image, and a polygonal frame surrounding the to-be-corrected content is acquired.

In this embodiment, based on the target image acquired in step 201, the subject may detect the to-be-corrected content from the target image, and acquire a polygonal frame surrounding the to-be-corrected content.

The subject for performing the method for image processing may apply a model (for example, a convolutional neural network) in the field of image recognition or image detection according to the related technology to this step, so as to detect the to-be-corrected content from the target image and acquire the polygonal frame surrounding the to-be-corrected content. Here, the number of sides included in the polygonal frame may be determined by a training sample for training the model. In an example, the training sample for training the model is a sample image marked with a quadrilateral frame, and thus the polygonal frame is a quadrilateral frame. In another example, the training sample for training the model is a sample image marked with a pentagon frame, and thus the polygonal frame is a pentagon frame.

In some optional implementations of this embodiment, the subject for performing the method for image processing may detect the to-be-corrected content from the target image, and acquire a minimum quadrilateral frame surrounding the to-be-corrected content.

In this implementation, the minimum quadrilateral frame is a quadrilateral frame with a smallest area surrounding the to-be-corrected content. In this implementation, the minimum quadrilateral frame can accurately represent a region where the to-be-corrected content is located in the image, which is helpful for generating an accurate correction identifier in subsequent steps. Moreover, the quadrilateral frame has fewer size parameters, thereby simplifying generation of the correction identifier in the subsequent steps.

In step 203, a correction result about the to-be-corrected content is acquired.

In this embodiment, the subject determines whether the to-be-corrected content satisfies a preset condition after detecting the to-be-corrected content from the target image, and then acquires the correction result about the to-be-corrected content. The correction result indicates whether the to-be-corrected content satisfies the preset condition, including but not limited to at least one of a character, a number, a symbol, an image, a video, and audio. In an example, the correction result may include "1" and "0", where "1" may indicate that the to-be-corrected content satisfies the preset condition, and "0" may indicate that to-be-corrected content does not satisfy the preset condition.

The subject may determine whether the to-be-corrected content satisfies the preset condition in various manners. In an example, the subject stores a dictionary in advance, and then compares a word in the to-be-corrected content with a preset word in the dictionary to determine whether the word in the to-be-corrected content includes a typo. The subject determines that the to-be-corrected content satisfies the preset condition if the word in the to-be-corrected content includes no typo. In another example, the subject stores a preset answer set in advance, and a preset answer in the preset answer set corresponds to a preset question in a preset question set. The subject acquires a question corresponding to an answer in the to-be-corrected content (for example, by taking a photo or inputted by a user), searches the preset question set for a preset question identical to the acquired question, searches the preset answer set for a preset answer corresponding to the preset question, and finally matches the found preset answer with the answer in the to-be-corrected content, to determine whether the answer in the to-be-corrected content is the same as the preset answer. The subject determines that the to-be-corrected content satisfies the preset condition if the answer in the to-be-corrected content is the same as the preset answer.

In step 204, a correction identifier corresponding to the correction result and matching a size of the polygonal frame is generated.

In this embodiment, based on the correction result acquired in step 203, the subject generates a correction identifier corresponding to the correction result and matching the size of the polygonal frame.

In this embodiment, the correction result may include two categories, one is a first-type correction result which indicates that the to-be-corrected content satisfies the preset condition, and the other is a second-type correction result which indicates that the to-be-corrected content does not satisfy the preset condition. In practice, the user may preset a first-type correction identifier for marking the first-type correction result, and preset a second-type correction identifier for marking the second-type correction result. That is, the first-type correction result corresponds to the first-type correction identifier, and the second-type correction result corresponds to the second-type correction identifier. In this embodiment, the subject may first determine a correction identifier corresponding to the correction result obtained in step 203 as an initial correction identifier. Then, the subject generates a correction identifier matching the size of the polygonal frame based on the initial correction identifier in various manners. In an example, the polygonal frame is a rectangle frame, and the initial correction identifier is "x". The subject first adds the initial correction identifier to the rectangle frame with a center of the rectangle frame coincides with a center (that is, an intersection of two straight lines in "x") of the initial correction identifier, and then determines whether the initial correction identifier is fully enclosed in the rectangle frame. The subject scales the initial correction identifier in response to the initial correction identifier failing to be enclosed in the rectangle frame, so that the initial correction identifier is fully enclosed in the rectangle frame. Finally, the subject acquires the scaled initial correction identifier, that is, the correction identifier matching the size of the rectangle frame.

In the related technology, to-be-corrected content may vary in length while a preset image for correction is fixed in size. In this case, a preset image that is large in size may be added to to-be-corrected content that is small in length in order to indicate a correct or incorrect answer by presenting the preset picture around the answer, which is out of line with the actual correction scenario. The added preset image is incongruous in the to-be-corrected content and thus has poor display effect. Moreover, in a case of multiple to-be-corrected content in one photographed image, a preset image corresponding to one to-be-corrected content may overlap a preset image corresponding to another to-be-corrected content, affecting display of the correction result.

In some optional implementations of this embodiment, the subject may generate the correction identifier corresponding to the correction result and matching the size of the polygonal frame by the following steps.

First, the subject acquires a preset correction identifier sequence corresponding to the correction result.

Preset correction identifiers in the preset correction identifier sequence are arranged in order of size. The preset correction identifiers in the preset correction identifier sequence respectively correspond to preset size ranges in a preset size range set.

As can be seen from the foregoing, the first-type correction result corresponds to the first-type correction identifier, and the preset correction identifier sequence corresponding to the first-type correction result may be a sequence formed by first-type correction identifiers in various sizes. Similarly, the second-type correction result corresponds to the second-type correction identifier, and the preset correction identifier sequence corresponding to the second-type correction result may be a sequence formed by second-type correction identifiers in various sizes.

It should be noted that the size of the correction identifier may be characterized by various ways. In an example, the size of the correction identifier is characterized by a length of a line included in the correction identifier, for example, a length of each of two lines included in "x". In another example, the size of the correction identifier is characterized by a length of a smallest rectangular frame that encloses the correction identifier.

In this implementation, each preset correction identifier in the preset correction identifier sequence corresponds to a preset size range in a preset size range set. The preset size range corresponding to the preset correction identifier is a size range of a polygonal frame matching the preset correction identifier. The preset size range set may be a size range set for each size of the polygonal frame, for example, a size range set for a length, a width, or a centerline length of the polygonal frame.

Then, the subject determines the size of the polygonal frame obtained in step 202.

The subject may determine the size of the polygonal frame obtained in step 202 based on the size of the polygonal frame targeted by the preset size range set. In an example, the preset size range set is a size range set for the length of the polygonal frame, and the subject determines the length of the polygonal frame obtained in step 202. In another example, the preset size range set is a size range set for the width of the polygonal frame, and the subject determines the width of the polygonal frame obtained in step 202.

Next, the subject determines, from the preset size range set, a preset size range matching the size of the polygonal frame, as a target size range.

In an example, the preset size range set includes [0, 10); [10, 20); [20, 30), respectively correspond to a preset correction identifier 1, a preset correction identifier 2 and a preset correction identifier 3 in the preset correction identifier sequence. The preset correction identifier 1 is smaller than the preset correction identifier 2 in size, and the preset correction identifier 2 is smaller than the preset correction identifier 3 in size. The subject determines that a length of the polygonal frame is 15 by the above steps. Then in this step, the subject determines the preset size range "[10, 20)" including 15 from "[0, 10); [10, 20); [20, 30)" as the target size range.

Finally, the subject determines the preset correction identifier corresponding to the target size range as the correction identifier corresponding to the correction result and matching the size of the polygonal frame.

Further, in the above example here, the subject may determine the preset correction identifier 2 corresponding to the target size range "[10, 20)" as the correction identifier corresponding to the correction result and matching the size of the polygonal frame.

In step 205, the target image including the generated correction identifier is outputted so as to display the target image including the generated correction identifier.

In this embodiment, based on the correction identifier generated in step 204, the subject may output the target image including the generated correction identifier so as to display the target image including the generated correction identifier.

The subject may directly output and display the target image including the generated correction identifier. Alternatively, the subject outputs the target image including the generated correction identifier to other electronic device in communication with the subject, for the electronic device to display the target image including the generated correction identifier.

Here, it should be noted that the correction identifier included in the target image may be located in a region where the to-be-corrected content is located in the target image. In a case the correction identifier obtained in step 204 is directly generated in the region where the to-be-corrected content is located, the subject directly outputs in this step the target image including the correction identifier obtained in step 204. In a case the correction identifier obtained in step 204 is not generated in the region where the to-be-corrected content is located, the subject first arranges the correction identifier generated in step 204 in the region where the to-be-corrected content is located, and then outputs the target image including the correction identifier.

In some optional implementations of this embodiment, the subject may remove the polygonal frame from the target image before step 205. In this way, the correspondence between the to-be-corrected content and the correction identifier can be highlighted, thereby reducing influence of unnecessary factors and improving display effect of the image.

Figure 3:
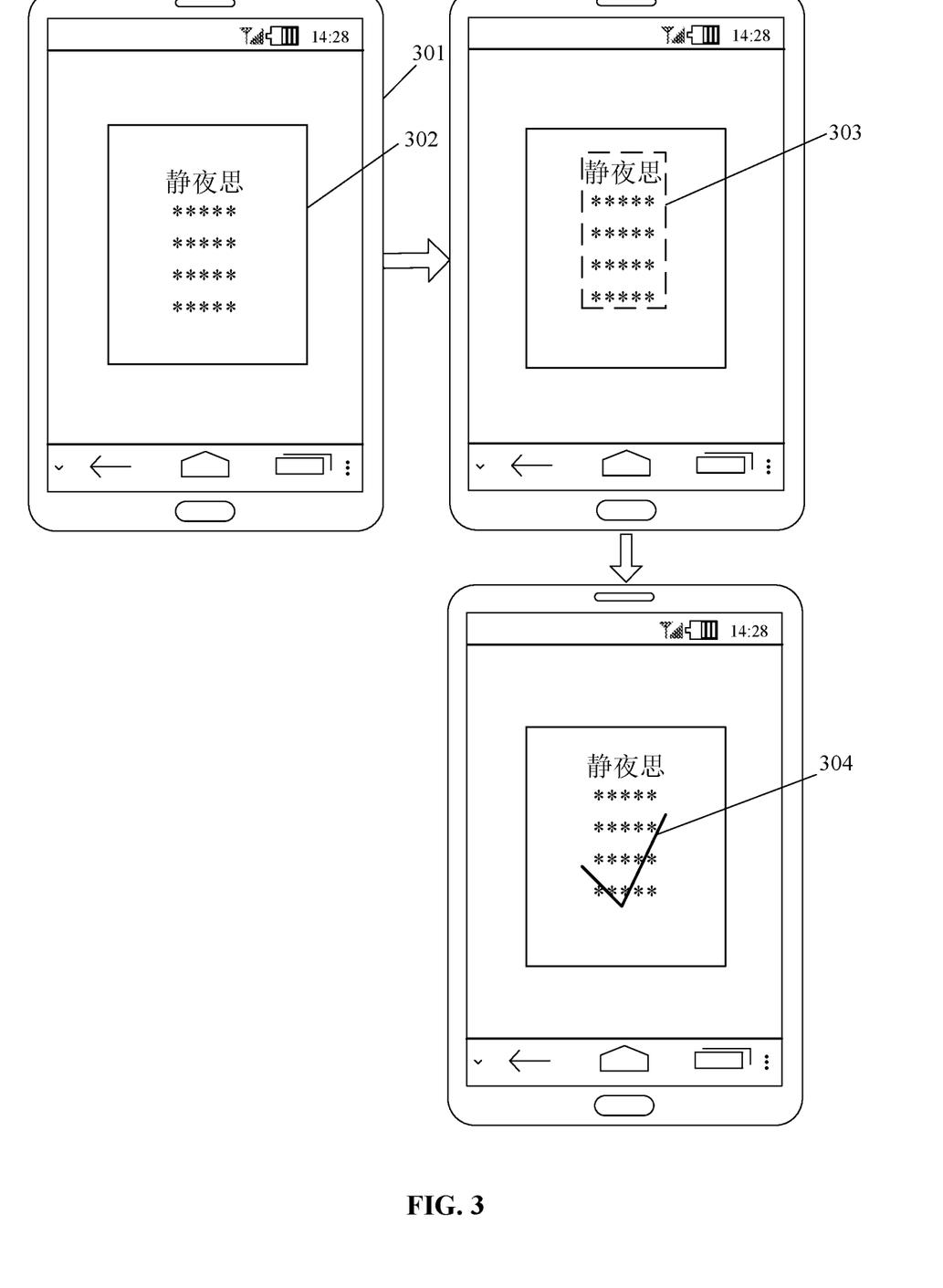
FIG. 3 is a schematic diagram illustrating an application scenario of the method for image processing according to an embodiment of the present disclosure.

Reference is made to FIG. 3, which is a schematic diagram illustrating an application scenario of the method for image processing according to this embodiment. In the application scenario shown in FIG. 3, a mobile phone 301 may acquire a target image 302 first. The target image 302 may be obtained by photographing an ancient poem written by a student (that is, the to-be-corrected content). Then, the mobile phone 301 detects the ancient poem from the target image 302 and acquires a quadrilateral frame 303 surrounding the ancient poem. Next, the mobile phone 301 acquires a correction result about the ancient poem. The correction result indicates whether the ancient poem is the same as a preset ancient poem (that is, whether the to-be-corrected content satisfies the preset condition). Then, the mobile phone 301 generates a correction identifier 304 corresponding to the acquired correction result and matching a size of the quadrilateral frame 303. Here, the correction result corresponding to the correction identifier 304 indicates that the ancient poem is the same as the preset ancient poem. Finally, the mobile phone 301 outputs the target image 302 including the generated correction identifier 304, and displays the target image 302 including the generated correction identifier 304.

With the method according to the above embodiments of the present disclosure, the to-be-corrected content can be automatically corrected. Moreover, compared with the existing solutions, a correction identifier matching the length of the to-be-corrected content can be generated and outputted according to the present disclosure, so that the outputted correction identifier is in line with the actual application scenario, thereby improving the display effect of the image. In addition, since the correction identifier generated according to the present disclosure matches the length of the to-be-corrected content, a possibility that a correction identifier corresponding to one to-be-corrected content overlaps a correction identifier corresponding to another to-be-corrected content in a scenario where a target image includes multiple to-be-corrected content can be greatly reduced, thereby improving effectiveness of the display of correction identifiers.

Figure 4:
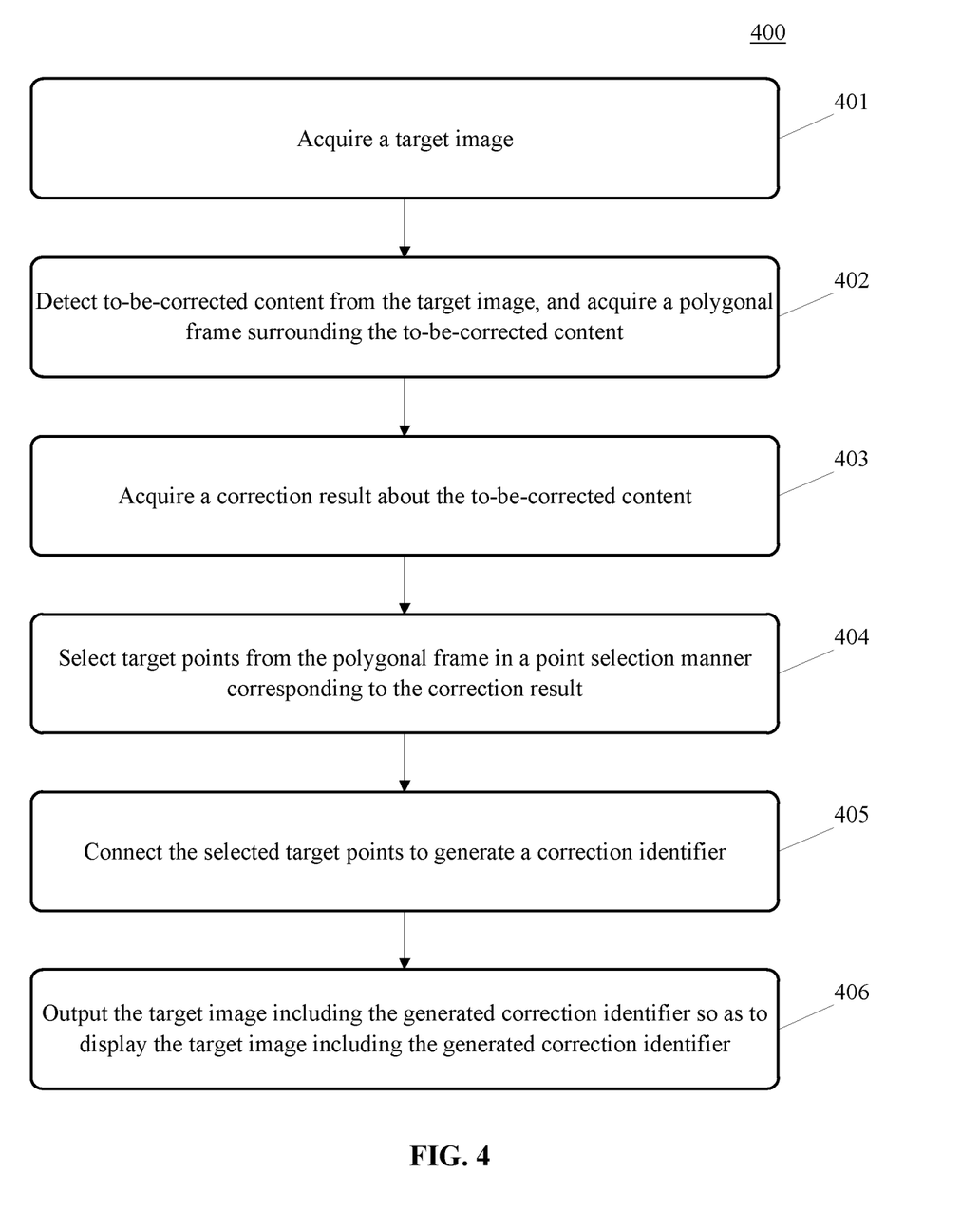
FIG. 4 is a flowchart illustrating a method for image processing according to another embodiment of the present disclosure.

Further reference is made to FIG. 4, which illustrates a flow 400 of the method for image processing according to another embodiment. The flow 400 of the method for image processing includes the following steps 401 to 406.

In step 401, a target image is acquired.

In this embodiment, a subject for performing the method for image processing (for example, the terminal device shown in FIG. 1) may acquire the target image remotely or locally through wired connection or wireless connection. The target image is obtained by photographing to-be-corrected content. The to-be-corrected content may be content to be determined whether it satisfies a preset condition. In case that the to-be-corrected content satisfies the preset condition, the to-be-corrected content is marked with a preset first-type correction identifier. In case that the to-be-corrected content does not satisfy the preset condition, the to-be-corrected content may be marked with a preset second-type correction identifier. Here, the preset condition depends on the to-be-corrected content.

In step 402, the to-be-corrected content is detected from the target image, and a polygonal frame surrounding the to-be-corrected content is acquired.

In this embodiment, based on the target image acquired in step 401, the subject may detect the to-be-corrected content from the target image, and acquire a polygonal frame surrounding the to-be-corrected content.

In step 403, a correction result about the to-be-corrected content is acquired.

In this embodiment, the subject determines whether the to-be-corrected content satisfies a preset condition after detecting the to-be-corrected content from the target image, and then acquires the correction result about the to-be-corrected content. The correction result indicates whether the to-be-corrected content satisfies the preset condition, including but not limited to at least one of a character, a number, a symbol, an image, a video, and audio.

In step 404, target points are selected from the polygonal frame in a point selection manner corresponding to the correction result.

In this embodiment, the correction result corresponds to a predetermined point selection manner. Further, based on the correction result obtained in step 403, the subject selects the target points from the polygonal frame in the point selection manner corresponding to the correction result. The target points are for forming the correction identifier.

In this embodiment, the user may set a first-type point selection manner in advance for the first-type correction result, and set a second-type point selection manner in advance for the second-type correction result. Points selected in the first-type point selection manner may be connected to form the first-type correction identifier (i.e., corresponding to the first-type correction result). Points selected in the second-type point selection manner be connected to form the second-type correction identifier (i.e., corresponding to the second-type correction result).

In an example, the polygonal frame is a rectangle frame, and the correction result obtained in step 403 is "0". A correction identifier corresponding to this correction result is "x". The point selection manner corresponding to this correction result may include "first randomly selecting a vertex of the rectangle frame as an initial target point, and then sequentially selecting other vertices of the rectangle frame clockwise as target points". Finally, four target points are selected. It is self-explanatory that the correction identifier "x" is obtained by connecting the target point selected first to the target point selected third and connecting the target point selected second to the target point selected fourth.

In step 405, the selected target points are connected to generate a correction identifier.

In this embodiment, the subject connects the target points selected in step 404 to generate the correction identifier.

The user may set a connection sequence in advance based on the first-type point selection manner for generating the first-type correction identifier, and set a connection sequence in advance based on the second-type point selection manner for generating the second-type correction identifier. Then, the subject determines a connection sequence of the target points based on a type of the point selection manner adopted in step 404, and connects the target points according to the connection sequence to generate the correction identifier.

In an example, the first-type correction identifier is "√". The first-type point selection manner includes "first selecting a midpoint of a bottom side of the quadrilateral frame as a first target point, then selecting a midpoint of a side on the left of the first target point as a second target point, and finally selecting a vertex on the right of the first target point and above the second target point as a third target point". The user may set the connection sequence for generating "√" as: connecting the selected first target point to the second target point and then connecting the selected first target point to the third target point.

In another example, the second-type correction identifier is "x". The second-type point selection manner includes "randomly selecting a vertex of the quadrilateral frame as a first target point, and then clockwise selecting other vertices of the quadrilateral frame as a second target point, a third target point and a fourth target point sequentially". The user may set the connection sequence for generating "x" as: connecting the first target point to the third target point and then connecting the second target point to the fourth target point.

In practice, the subject may connect the selected target points with a straight line or a curved line, depending on a style of the correction identifier preset by the user. In an example, a circle serves as the second-type correction identifier, the subject selects target points from each side of the polygonal frame, and then connects the selected target points with a curve to obtain the circle.

Here, the subject may connect the target points with various curves such as an arc line or a Bezier curve.

It should be understood that when the connection manner (for example, with a straight line, a circular arc with K as a curvature, or a Bezier curve with a point P as an anchor point, where K and P may be set by the user) is determined, a size of a line connecting any two points on the polygonal frame is limited by the size of the polygonal frame. For example, a length of a straight line formed by connecting any two points on a quadrilateral frame is not be greater than a length of a diagonal of the quadrilateral frame. Therefore, the size of the correction identifier is also limited by the size of the polygonal frame. The size of the correction identifier decreases as the size of the polygonal frame decreases since the size of the correction identifier is limited by the size of the polygonal frame. Therefore, the correction identifier limited by the size of the polygonal frame is determined as the correction identifier matching the size of the polygonal frame in this embodiment.

In some optional implementations of this embodiment, a size of a line connecting a point inside the polygonal frame and a point inside the polygonal frame or on a side of the polygonal frame is also limited by the size of the polygonal frame. Therefore, the subject may also select the target point by the following steps: selecting a target point inside the polygonal frame and a target point on a side of the polygonal frame in the point selection manner corresponding to the correction result.

In an example, the first-type correction identifier is "√". The polygonal frame is a rectangle frame. The first-type point selection manner may include "first selecting a center of the rectangle frame as a first target point, then selecting from a bottom side of the rectangle frame a point on the right of the first target point and with a distance of a quarter of a length of a bottom side from a vertex of the bottom side as a second target point, and finally selecting a vertex on the right of the second target point and above the first target point as a third target point". The first target point, the second target point, and the third target point are sequentially connected to obtain the correction identifier "√" corresponding to the first-type correction result and matching the size of the rectangle frame.

In step 406, the target image including the generated correction identifier is outputted so as to display the target image including the generated correction identifier.

In this embodiment, based on the correction identifier generated in step 405, the subject may output the target image including the generated correction identifier so as to display the target image including the generated correction identifier.

Step 401, step 402, step 403, and step 406 may be performed in a manner similar to step 201, step 202, step 203, and step 205 in the foregoing embodiment, respectively. The above description for step 201, step 202, step 203 and step 205 are applicable to step 401, step 402, step 403 and step 406, and details are not repeated here.

As can be seen from FIG. 4, compared with the embodiment shown in FIG. 2, the point selection manner corresponding to the correction result is highlighted in the flow 400 of the method for image processing in this embodiment, and the target points are selected from the polygonal frame, and then are connected to obtain the correction identifier. Therefore, the solution described in this embodiment is another solution for generating a correction identifier matching the size of the polygonal frame, thereby improving diversity of image processing. Moreover, according to the solution described in this embodiment, after target points are selected and connected to form a line, the correction identifier is generated directly in the region where the to-be-corrected content is located in the image without the step of adding the generated correction identifier to the region where the to-be-corrected content is located, thereby simplifying the process of image processing and improving the efficiency of image processing.

Figure 5:
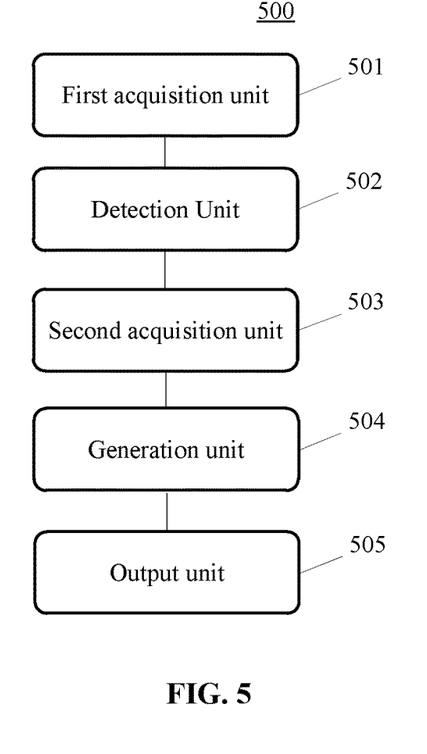
FIG. 5 is a schematic structural diagram illustrating an apparatus for image processing according to an embodiment of the present disclosure.

Referring to FIG. 5, an apparatus for image processing is provided according to an embodiment of the present disclosure, as an implementation of the method shown in the above Figures. This apparatus embodiment corresponds to the method embodiment shown in FIG. 2. The apparatus is appliable to various electronic devices.

As shown in FIG. 5, the apparatus 500 for image processing in this embodiment includes: a first acquisition unit 501, a detection unit 502, a second acquisition unit 503, a generation unit 504 and an output unit 505. The first acquisition unit 501 is configured to acquire a target image. The target image is obtained by photographing to-be-corrected content. The detection unit 502 is configured to detect the to-be-corrected content from the target image, and acquire a polygonal frame surrounding the to-be-corrected content. The second acquisition unit 503 is configured to acquire a correction result about the to-be-corrected content. The correction result indicates whether the to-be-corrected content satisfies a preset condition. The generation unit 504 is configured to generate a correction identifier corresponding to the correction result and matching a size of the polygonal frame. The output unit 505 is configured to output the target image including the generated correction identifier so as to display the target image including the generated correction identifier.

In this embodiment, the first acquisition unit 501 of the apparatus 500 for image processing may acquire the target image remotely or locally through a wired connection or a wireless connection. The target image is obtained by photographing the to-be-corrected content. The to-be-corrected content may be content to be determined whether it satisfies the preset condition. In case that the to-be-corrected content satisfies the preset condition, the to-be-corrected content is marked with a preset first-type correction identifier. In case that the to-be-corrected content does not satisfy the preset condition, the to-be-corrected content may be marked with a preset second-type correction identifier. Here, the preset condition depends on the to-be-corrected content.

In this embodiment, based on the target image acquired by the first acquisition unit 501, the detection unit 502 detects the to-be-corrected content from the target image, and acquires the polygonal frame surrounding the to-be-corrected content.

In this embodiment, after the detection unit 502 detects the to-be-corrected content from the target image, the second acquisition unit 503 determines whether the to-be-corrected content satisfies the preset condition, to obtain the correction result about the to-be-corrected content. The correction result indicates whether the to-be-corrected content satisfies the preset condition, including but not limited to at least one of a character, a number, a symbol, an image, a video, and audio.

In this embodiment, based on the correction result obtained by the second acquisition unit 503, the generation unit 504 generates the correction identifier corresponding to the correction result and matching the size of the polygonal frame.

In this embodiment, the correction result may include two categories, one is a first-type correction result which indicates that the to-be-corrected content satisfies the preset condition, and the other is a second-type correction result which indicates that the to-be-corrected content does not satisfy the preset condition. In practice, the user may preset a first-type correction identifier for marking the first-type correction result, and preset a second-type correction identifier for marking the second-type correction result. That is, the first-type correction result corresponds to the first-type correction identifier, and the second-type correction result corresponds to the second-type correction identifier.

In this embodiment, based on the correction identifier generated by the generation unit 504, the output unit 505 outputs the target image including the generated correction identifier so as to display the target image including the generated correction identifier.

Here, it should be noted that the correction identifier included in the target image may be located in the region where the to-be-corrected content is located in the target image.

In some optional implementations of this embodiment, the correction result corresponds to a predetermined point selection manner. The generating unit 504 includes: a selection module and a generation module (that are not shown in the drawings). The selection module is configured to select target points from the polygonal frame in a point selection manner corresponding to the correction result. The generation module is configured to connect the selected target points to generate the correction identifier.

In some optional implementations of this embodiment, the selection module is further configured to: select a target point on a side of the polygonal frame and select a target point inside the polygonal frame in the point selection manner corresponding to the correction result.

In some optional implementations of this embodiment, the generation unit 504 includes an acquisition module, a first determination module, a second determination module and a third determination module (that are not shown in the drawings). The acquisition module is configured to acquire a preset correction identifier sequence corresponding to the correction result. Preset correction identifiers in the preset correction identifier sequence are arranged in order of size. The preset correction identifiers in the preset correction identifier sequence respectively correspond to preset size ranges in a preset size range set. The first determination module is configured to determine a size of the polygonal frame. The second determination module is configured to determine, from the preset size range set, a preset size range matching the size of the polygonal frame, as a target size range. The third determination module is configured to determine a preset correction identifier corresponding to the target size range as the correction identifier corresponding to the correction result and matching the size of the polygonal frame.

In some optional implementations of this embodiment, the detection unit 502 is further configured to detect the to-be-corrected content from the target image, and acquire a minimum quadrilateral frame surrounding the to-be-corrected content.

In some optional implementations of this embodiment, the generation unit 504 includes: a fourth determination module, an addition module, a fifth determination module and a scaling module (that are not shown in the drawings). The fourth determination module is configured to determine a correction identifier corresponding to a type of the correction result as an initial correction identifier. The addition module is configured to add the initial correction identifier to the polygonal frame with a center of the polygonal frame coincides with a center of the initial correction identifier. The fifth determination module is configured to determine whether the initial correction identifier is fully enclosed in the polygonal frame. The scaling module is configured to scale the initial correction identifier in response to the initial correction identifier failing to be enclosed in the polygonal frame, so that the initial correction identifier is fully enclosed in the polygonal frame, so as to acquire the scaled initial correction identifier as the correction identifier matching the size of the polygonal frame.

In some optional implementations of this embodiment, the apparatus 500 further includes a removing unit (not shown in the drawings) configured to remove the polygonal frame from the target image.

It should be understood that the units included in the apparatus 500 correspond to the respective steps in the method described with reference to FIG. 2. Therefore, the operations, features and beneficial effects described above with respect to the method are applicable to the apparatus 500 and the units included therein, and details are not described here.

With the apparatus 500 according to the above embodiments of the present disclosure, the to-be-corrected content can be automatically corrected. Moreover, compared with the existing solutions, a correction identifier matching the length of the to-be-corrected content can be generated and outputted according to the present disclosure, so that the outputted correction identifier is in line with the actual application scenario, thereby improving the display effect of the image. In addition, since the correction identifier generated according to the present disclosure matches the length of the to-be-corrected content, a possibility that a correction identifier corresponding to one to-be-corrected content overlaps a correction identifier corresponding to another to-be-corrected content in a scenario where a target image includes multiple to-be-corrected content can be greatly reduced, thereby improving effectiveness of the display of correction identifiers.

Figure 6:
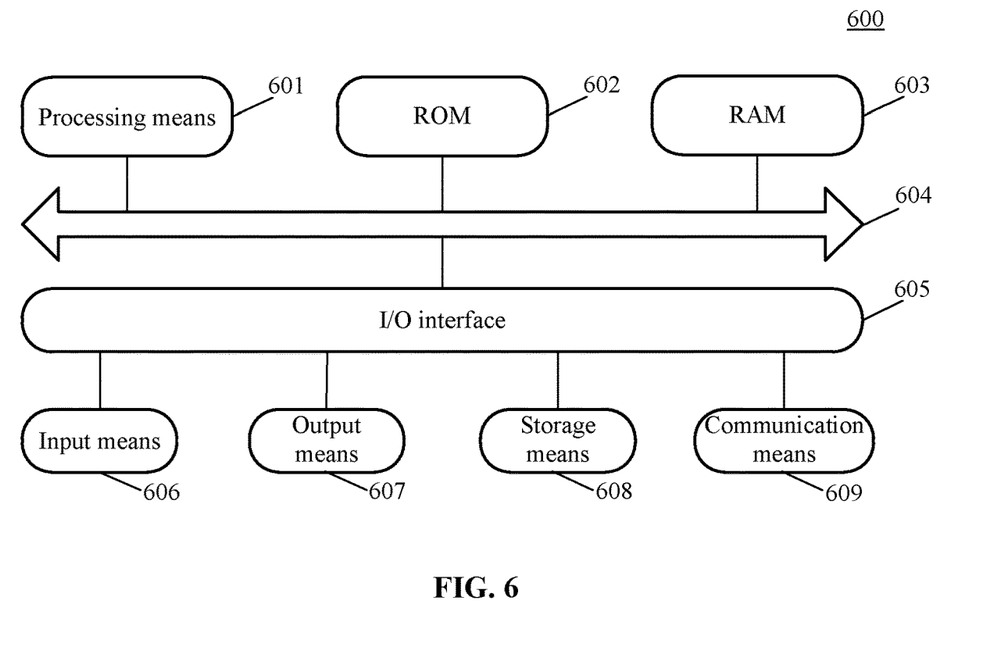
FIG. 6 is a schematic structural diagram illustrating a computer system suitable for implementing an electronic device according to an embodiment of the present disclosure.

Reference is made to FIG. 6, which shows a schematic structural diagram illustrating an electronic device (e.g., the terminal device in FIG. 1) 600 suitable for implementing embodiments of the present disclosure. The terminal device in this embodiment of the present disclosure may include but is not limited to a mobile terminal such as a mobile phone, a notebook computer, a digital broadcast receiver, a PDA (personal digital assistant), a PAD (tablet), a PMP (portable multimedia player), an in-vehicle terminal (e.g., an in-vehicle navigation terminal), as well as a stationary terminal such as a digital TV and a desktop computer. The electronic device shown in FIG. 6 is only an example, and should not impose any limitation on the function and scope of use of the embodiments of the present disclosure.

As shown in FIG. 6, the electronic device 600 may include a processing means (e.g., a central processing unit and a graphics processing unit) 601. The processing means 601 may perform various appropriate actions and processing according to a program stored in a read only memory (ROM) 602 or a program loaded from a storage means 608 into a random-access memory (RAM) 603. In the RAM 603, various programs and data necessary for the operation of the electronic device 600 are also stored. The processing means 601, the ROM 602 and the RAM 603 are connected to each other via a bus 604. An input/output (I/O) interface 605 is also connected to the bus 604.

Generally, the following means may be connected to the I/O interface 605: an input means 606 including, for example, a touch screen, a touch pad, a keyboard, a mouse, a camera, a microphone, an accelerometer and a gyroscope; an output means 607 including, for example, a liquid crystal display (LCD), a speaker and a vibrators; a storage means 608 including, for example, a tape and a hard disk; and a communication means 609. The communication means 609 may allow the electronic device 600 to communicate wirelessly or by wire with other devices so as to exchange data. Although FIG. 6 shows the electronic device 600 having various means, it should be understood that the electronic device 600 is unnecessary to implement or have all of the illustrated means. Alternatively, the electronic device 600 may implement or be equipped with more or fewer means.

In particular, according to embodiments of the present disclosure, the processes described above with reference to the flowcharts may be implemented as computer software programs. For example, a computer program product is provided according to embodiments according to the present disclosure. The computer program product includes a computer program carried on a computer readable medium. The computer program contains program code for carrying out the method shown in the flowchart. In such embodiments, the computer program may be downloaded and installed from the network via the communication means 609, or installed from the storage means 608 or the ROM 602. When the computer program is executed by the processing means 601, the functions defined in the method of the embodiments of the present disclosure are implemented.

It should be noted that the computer-readable medium described in the present disclosure may be a computer-readable signal medium or a computer-readable storage medium, or any combination of the above two. The computer-readable storage medium may include but is not limited to electrical, magnetic, optical, electromagnetic, infrared, or semiconductor systems, apparatuses, or devices, or a combination of any of the above, for example. More detailed examples of the computer-readable storage medium may include but is not limited to an electrical connection with one or more wires, a portable computer disk, a hard disk, a random-access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program. The program may be used by or in conjunction with an instruction execution system, apparatus or device. In the present disclosure, however, the computer-readable signal medium may include a data signal broadcasted in a baseband or as part of a carrier wave with computer-readable program code embodied thereon. Such broadcasted data signal may be in variety of forms, including but not limited to an electromagnetic signal, an optical signal, or any suitable combination of the foregoing. The computer-readable signal medium may be any computer-readable medium other than the computer-readable storage medium. The computer-readable signal medium may send, broadcast, or transmit the program for use by or in connection with the instruction execution system, apparatus, or device. The program code embodied on the computer readable medium may be transmitted by any suitable medium including, but not limited to, an electrical wire, an optical fiber cable, RF (radio frequency), or any suitable combination of the foregoing.

The computer-readable medium may be included in the electronic device, or exist alone without being assembled into the electronic device. The computer-readable medium carries one or more programs. The electronic device, when executing the one or more programs: acquires a target image, where the target image is obtained by photographing to-be-corrected content; detects the to-be-corrected content from the target image, and acquires a polygonal frame surrounding the to-be-corrected content; acquires a correction result about the to-be-corrected content, where the correction result indicates whether the to-be-corrected content satisfies a preset condition; generates a correction identifier corresponding to the correction result and matching a size of the polygonal frame; and outputs the target image including the generated correction identifier so as to display the target image including the generated correction identifier.

The computer program code for carrying out operations of the present disclosure may be written in one or more programming languages, or a combination thereof. The programming languages include object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to the user computer through any kind of network, including a local area network (LAN) or a wide area network (WAN). Alternatively, the remote computer may be connected to an external computer (e.g., over the Internet provided by the Internet service provider).

The flowcharts and block diagrams in the drawings illustrate the architecture, functionality, and operation of possible implementations of the system, the method and the computer program product according to various embodiments of the present disclosure. In this regard, each block in the flowcharts or block diagrams may represent a module, a program segment, or a portion of code. The module, program segment, or portion of code contains one or more executable instructions for implementing specified logical functions. It should also be noted that, in some alternative implementations, the functions illustrated in the blocks may be implemented in an order different from the order illustrated in the drawings. For example, two blocks shown in succession may, in fact, be implemented substantially concurrently, or in a reverse order, depending on the functionality involved. It should further be noted that each block in the block diagrams and/or flowcharts and a combination of blocks in the block diagrams and/or flowcharts may be implemented in special purpose hardware-based system that performs the specified functions or operations, or may be implemented in a combination of special purpose hardware and computer instructions.

The units involved in the embodiments of the present disclosure may be implemented by software or hardware. The name of a unit does not, in any case, qualify the unit itself. For example, the first acquisition unit may also be described as a "unit for acquiring a target image".

The above description illustrates merely preferred embodiments of the present disclosure and the technical principles employed in the present disclosure. Those skilled in the art should understand that the scope of disclosure involved in the present disclosure should cover other technical solutions formed by any combination of the above technical features or their equivalents without departing from the above disclosed concept, for example, a technical solution formed by replacing the feature with (but not limited to) a technical feature with similar functions disclosed herein, rather than be limited to the technical solutions formed by the specific combination of the technical features.

What is claimed is:

1. A computer-implemented method for improving display effects of displaying images on an electronic device, comprising:
    acquiring a target image, wherein the target image is obtained by photographing to-be-corrected content;

detecting the to-be-corrected content from the target image and acquiring a polygonal frame surrounding the to-be-corrected content by an image recognition model, wherein the image recognition model is trained to generate the polygonal frame based on detecting content, and wherein the acquiring a polygonal frame surrounding the to-be-corrected content by the image recognition model further comprises generating the polygonal frame with a minimum area surrounding the to-be-corrected content;

acquiring a correction result about the to-be-corrected content, wherein the correction result indicates whether the to-be-corrected content satisfies a preset condition;

generating a correction identifier corresponding to the correction result and matching a size of the polygonal frame with the generated correction identifier fully enclosed in the polygonal frame;

removing the polygonal frame from the target image before outputting the target image comprising the generated correction identifier; and displaying the target image comprising the generated correction identifier on the electronic device.

2. The method according to claim 1, wherein the correction result corresponds to a predetermined point selection manner, and wherein the generating a correction identifier corresponding to the correction result and matching a size of the polygonal frame comprises:

selecting target points from the polygonal frame in the point selection manner corresponding to the correction result; and connecting the selected target points to generate the correction identifier.

3. The method according to claim 2, wherein the selecting target points from the polygonal frame in the point selection manner corresponding to the correction result comprises:

selecting a target point on a side of the polygonal frame and selecting a target point inside the polygonal frame in the point selection manner corresponding to the correction result.

4. The method according to claim 1, wherein the generating a correction identifier corresponding to the correction result and matching a size of the polygonal frame comprises:

acquiring a preset correction identifier sequence corresponding to the correction result, wherein preset correction identifiers in the preset correction identifier sequence are arranged in order of size, and respectively correspond to preset size ranges in a preset size range set;

determining a size of the polygonal frame;

determining, from the preset size range set, a preset size range matching the size of the polygonal frame, as a target size range; and determining a preset correction identifier corresponding to the target size range as the correction identifier corresponding to the correction result and matching the size of the polygonal frame.

5. The method according to claim 1, wherein the detecting the to-be-corrected content from the target image and acquiring a polygonal frame surrounding the to-be-corrected content comprises:

detecting the to-be-corrected content from the target image, and acquiring a minimum quadrilateral frame surrounding the to-be-corrected content.

6. The method according to claim 1, wherein the generating a correction identifier corresponding to the correction result and matching a size of the polygonal frame comprises:

determining a correction identifier corresponding to a type of the correction result as an initial correction identifier;

adding the initial correction identifier to the polygonal frame with a center of the polygonal frame coincides with a center of the initial correction identifier;

determining whether the initial correction identifier is fully enclosed in the polygonal frame; and scaling the initial correction identifier in response to the initial correction identifier failing to be enclosed in the polygonal frame, so that the initial correction identifier is fully enclosed in the polygonal frame; and acquiring the scaled initial correction identifier as the correction identifier matching the size of the polygonal frame.

7. The method according to claim 1, further comprising:

before the outputting the target image comprising the generated correction identifier, removing the polygonal frame from the target image.

8. An apparatus for improving display effects of displaying images on an electronic device, comprising:

at least one processor; and at least one memory communicatively coupled to the at least one processor and storing instructions that upon execution by the at least one processor cause the apparatus to:

acquire a target image, wherein the target image is obtained by photographing to-be-corrected content;

detect the to-be-corrected content from the target image and acquire a polygonal frame surrounding the to-be-corrected content by an image recognition model, wherein the image recognition model is trained to generate the polygonal frame based on detecting content, and wherein acquiring a polygonal frame surrounding the to-be-corrected content by the image recognition model further comprises generating the polygonal frame with a minimum area surrounding the to-be-corrected content;

acquire a correction result about the to-be-corrected content, wherein the correction result indicates whether the to-be-corrected content satisfies a preset condition;

generate a correction identifier corresponding to the correction result and matching a size of the polygonal frame with the generated correction identifier fully enclosed in the polygonal frame;

remove the polygonal frame from the target image before outputting the target image comprising the generated correction identifier; and display the target image comprising the generated correction identifier.

9. The apparatus according to claim 8, wherein the correction result corresponds to a predetermined point selection manner, and wherein the at least one memory further storing instructions that upon execution by the at least one processor cause the apparatus to:

select target points from the polygonal frame in the point selection manner corresponding to the correction result; and connect the selected target points to generate the correction identifier.

10. The apparatus according to claim 9, wherein the at least one memory further storing instructions that upon execution by the at least one processor cause the apparatus to:

select a target point on a side of the polygonal frame and selecting a target point inside the polygonal frame in the point selection manner corresponding to the correction result.

11. The apparatus according to claim 8, wherein the at least one memory further storing instructions that upon execution by the at least one processor cause the apparatus to:
- acquire a preset correction identifier sequence corresponding to the correction result, wherein preset correction identifiers in the preset correction identifier sequence are arranged in order of size, and respectively correspond to preset size ranges in a preset size range set;
- determine a size of the polygonal frame;
- determine, from the preset size range set, a preset size range matching the size of the polygonal frame, as a target size range; and
- determine a preset correction identifier corresponding to the target size range as the correction identifier corresponding to the correction result and matching the size of the polygonal frame.

12. The apparatus according to claim 8, wherein the at least one memory further storing instructions that upon execution by the at least one processor cause the apparatus to:
- detect the to-be-corrected content from the target image, and acquiring a minimum quadrilateral frame surrounding the to-be-corrected content.

13. The apparatus according to claim 8, wherein the at least one memory further storing instructions that upon execution by the at least one processor cause the apparatus to:
- determine correction identifier corresponding to a type of the correction result as an initial correction identifier;
- add the initial correction identifier to the polygonal frame with a center of the polygonal frame coincides with a center of the initial correction identifier;
- determine whether the initial correction identifier is fully enclosed in the polygonal frame; and
- scale the initial correction identifier in response to the initial correction identifier failing to be enclosed in the polygonal frame, so that the initial correction identifier is fully enclosed in the polygonal frame; and acquiring the scaled initial correction identifier as the correction identifier matching the size of the polygonal frame.

14. A non-transitory computer-readable storage medium, storing a computer program, wherein the program, when executed by a computer, cause the computer to:
- acquire a target image, wherein the target image is obtained by photographing to-be-corrected content;
- detect the to-be-corrected content from the target image and acquiring a polygonal frame surrounding the to-be-corrected content by an image recognition model, wherein the image recognition model is trained to generate the polygonal frame based on detecting content, and wherein acquiring a polygonal frame surrounding the to-be-corrected content by the image recognition model further comprises generating the polygonal frame with a minimum area surrounding the to-be-corrected content;
- acquire a correction result about the to-be-corrected content, wherein the correction result indicates whether the to-be-corrected content satisfies a preset condition;
- generate a correction identifier corresponding to the correction result and matching a size of the polygonal frame with the generated correction identifier fully enclosed in the polygonal frame;
- remove the polygonal frame from the target image before outputting the target image comprising the generated correction identifier; and
- display the target image comprising the generated correction identifier.

\* \* \* \* \*